C. P. PRICE.
OIL DISTRIBUTING APPARATUS.
APPLICATION FILED AUG. 8, 1908.
958,434.
Patented May 17, 1910
3 SHEETS—SHEET 3.
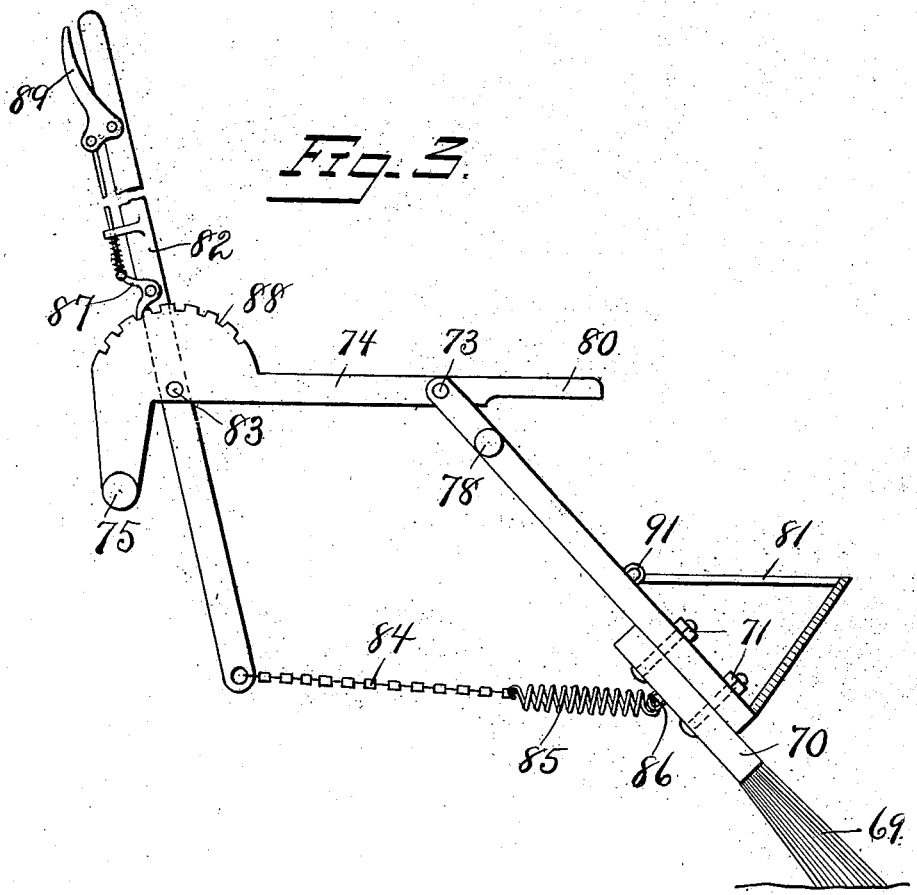

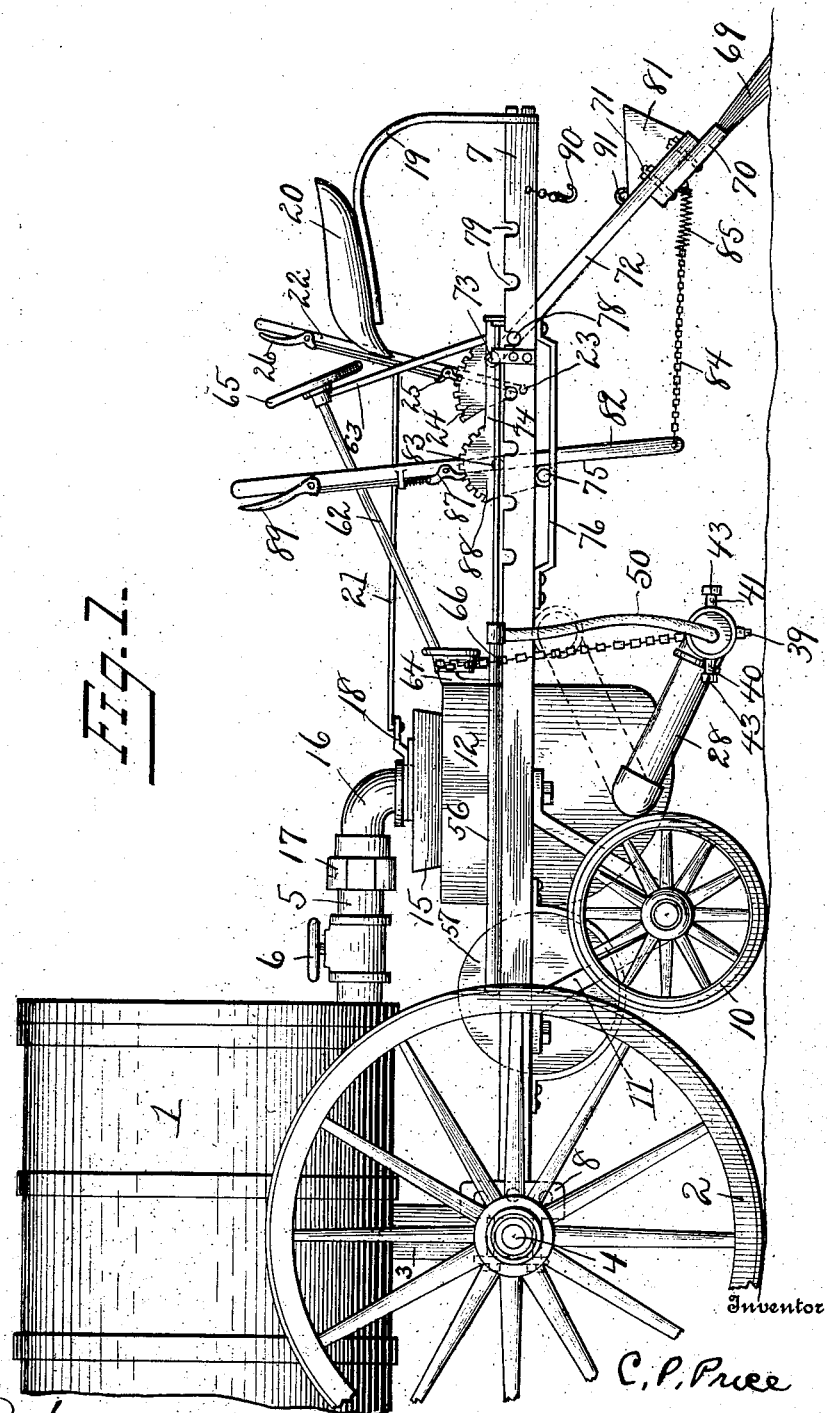

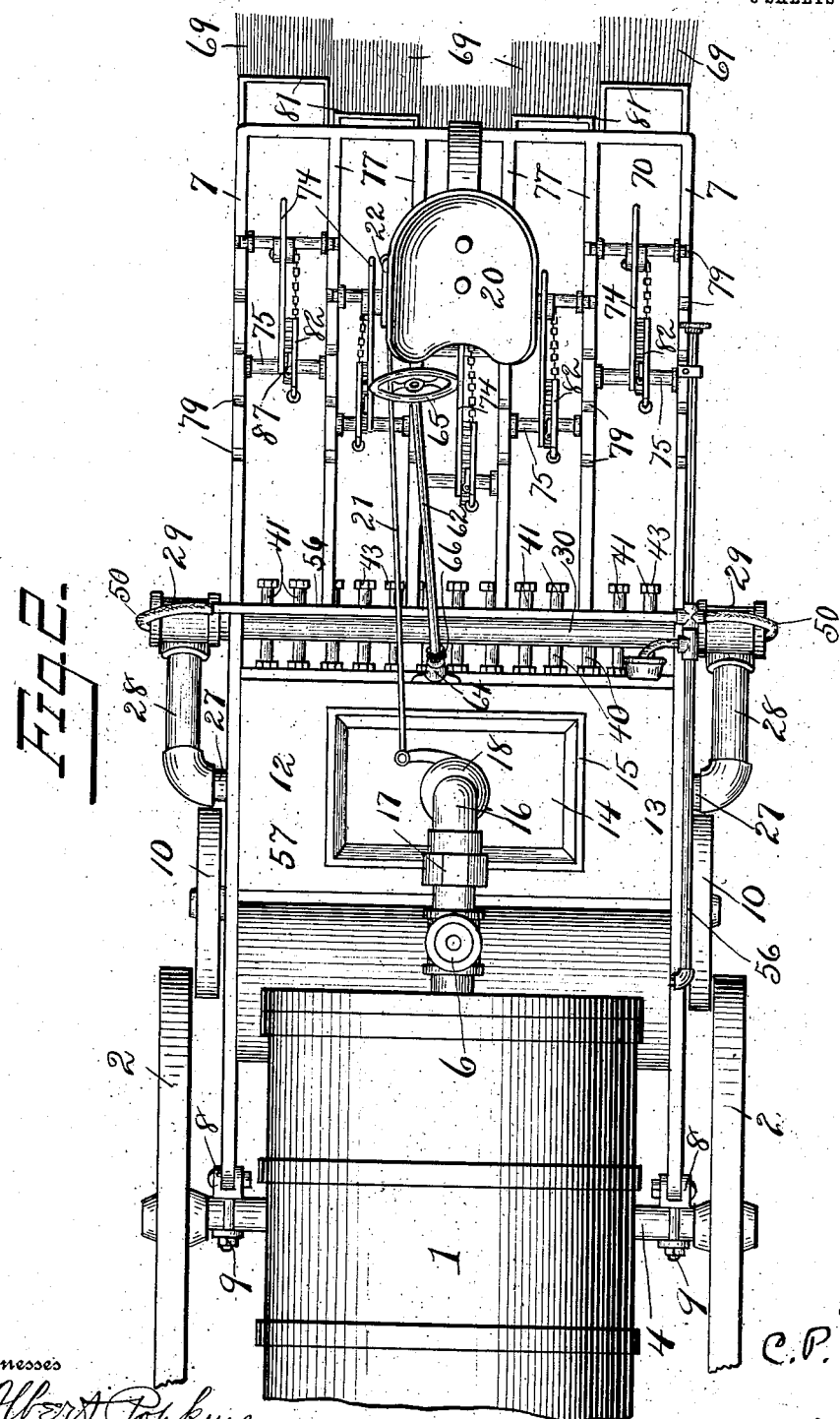

UNITED STATES PATENT OFFICE.

CHARLES P. PRICE, OF MALDEN, MASSACHUSETTS, ASSIGNOR TO AMERICAN TAR COMPANY, OF BOSTON, MASSACHUSETTS, A CORPORATION OF MASSACHUSETTS.

OIL-DISTRIBUTING APPARATUS.

958,434. Specification of Letters Patent. Patented May 17, 1910.

Original application filed June 6, 1908, Serial No. 437,089. Divided and this application filed August 8, 1908. Serial No. 447,554.

*To all whom it may concern:*

Be it known that I, CHARLES P. PRICE, a citizen of the United States, residing at Malden, in the county of Middlesex, State of Massachusetts, have invented certain new and useful Improvements in Oil-Distributing Apparatus, of which the following is a description, reference being had to the accompanying drawing and to the figures of reference marked thereon.

My invention relates to new and useful improvements in road-making machines, and has for an object to provide a device for distributing oil or the like upon a road bed, and also for brushing the oil, so that the same may be evenly laid upon the surface.

This application is a division of my application, Serial No. 437,089, filed June 6th, 1908.

The invention consists in the parts, arrangements and combinations hereinafter described and pointed out in the appended claims.

In the drawings, which show by way of illustration one embodiment of my invention,—Figure 1 is a side elevation showing a road-making machine with my improved apparatus attached thereto; Fig. 2 is top plan view of the same; and Fig. 3 is a detail view of the means for supporting and adjusting the spreaders.

The oil cart may be of any desired construction, and as herein shown consists of a tank 1, which is supported on running wheels in the usual manner, the rear wheels 2, 2, of which are illustrated in the drawing. Said tank rests on a bracket 3, which is secured to the axle 4 for the running wheels 2, 2. Said tank 1 has a delivering pipe 5 at the extreme rear lower end thereof, which is controlled by a suitable hand valve 6.

My improved distributing apparatus is carried by a frame 7, which is detachably secured to the axle 4 in any suitable manner. As herein illustrated, said frame 7 is pivoted to brackets 8, which are clamped to the axle by clamping bolts 9. The frame is also supported by small wheels 10, 10, which are carried by brackets 11 bolted to the frame 7 in any desired manner.

Mounted within the frame 7 is an auxiliary tank 12, which may be of any desired shape, but as herein shown is rectangular in cross section, with its bottom portion slightly rounded. The upper end of the tank 12 is provided with a cover 13, which has an opening 14 centrally thereof. A flanged portion 15 is secured to the cover 13, around the edges of the opening 14, and extends upwardly therefrom.

An elbow pipe 16, is secured to the delivery pipe 5 by means of a suitable coupling 17. Said elbow pipe 16 is so disposed as to open downwardly centrally over the opening 14 in the auxiliary tank. A gate valve 18 is provided for normally closing the end of the pipe 16.

The framework 7 is provided with a bracket 19, which carries a seat 20 for the operator. The gate valve 18 is connected by a rod 21 to a lever 22, which is pivoted at 23 to the supporting frame 7. Said lever is located adjacent the seat 20, so that the same may be readily manipulated by the operator. A segment rack 24 is secured to the frame 7 and a pawl 25 operated by a hand lever 26, serves as a means for locking the lever 22 in any desired position.

The auxiliary tank 12 is provided at each end near the bottom thereof, with a short section of pipe 27, to each of which is connected a delivering pipe 28. The delivering pipe 28 is secured to the short section of pipe 27 in such a manner that said pipe 28 may be readily swung about the pipe 27 as an axis. At the lower end the pipe 28 is threaded into a sleeve 29. The distributing pipe 30 is connected to the sleeve 29, so that the oil or liquid contained in the auxiliary tank may flow freely through the short length of pipe 27 at each end of the tank, then through the pipe 28 and the sleeve 29 to the distributing pipe 30.

The distributing pipe is provided with a plurality of sets of delivering nozzles 39, 40 and 41, having different sized openings. As shown in the present illustration of my invention, said sets of delivering nozzles are arranged substantially at 90° apart, although it is obvious that the same may be set closer together, or disposed in any desired manner in the distributing pipe. The outer end of the delivering nozzle 39 is threaded, so as to receive a cap 43, whereby the nozzle may be closed when desired. Said distributing pipe may be rotated in its support by any suitable means, so as to bring any set of the delivering nozzles to the lower side. It will be readily seen that all the nozzles may be closed by caps, with the exception of the nozzles at the lower side of the distributing pipe, so that the liquid in the auxiliary tank passing down into the distributing pipe will be delivered through the delivering nozzles to the road bed. If a heavy bituminous preparation is being distributed upon the road bed, then the distributing pipe will be so adjusted as to bring the large delivery nozzles at the lower side of the distributing pipe. If a heavy oil is used, the intermediate delivery nozzles may be brought into operation, and when desired, the smaller nozzles may be brought into operation. It will thus be seen that I have provided a distributer with delivering means which may be varied to accommodate the consistency of the liquid being distributed.

The operation of my device above described, will be obvious. The tank 1 is filled to the desired extent with the liquid to be distributed. Preferably said liquid is heated when placed in said tank 1, although it is obvious that from certain aspects of my invention, the distributing apparatus may be connected to a tank having means for heating the liquid, or to a tank from which it is desired to distribute the liquid without heating. The hand valve 6 is opened, so as to allow a free flow of the liquid through the delivery pipe 5. The operator through the lever 22 and the gate valve 18, controls the flow of the liquid into the auxiliary tank. The liquid in the auxiliary tank passes out through the pipes at the end thereof down into the distributing pipe, and is led from the distributing pipe through the open nozzles to the road bed. In order to facilitate the distributing of the liquid through the nozzles, I have provided a compressed air tank 57, from which lead pipes 56. Flexible pipes 50 are connected with the pipes 56 at one end, and at the other end lead into the distributing pipe 30. In order to provide a means for stopping the flow of liquid from the distributing pipe when passing cross walks in the road or the like, I have mounted the delivery pipes 28 as above noted, on the short sections of pipe 27, so that they may be readily turned axially thereon. A shaft 62 is mounted in suitable brackets 63 and 64, and provided with a hand wheel 65, which is readily accessible to the operator. At its lower end a chain 66 is secured to the shaft 62, so that when said shaft is rotated the chain will be wound up thereon. Said chain at its lower end is connected to the distributing pipe 30 in any suitable way. It will readily be seen that when the operator turns the hand wheel 65, the chain 66 may be wound on the shaft 62, and the distributing pipe turned about the short section of the pipe 27 as an axis, to a position shown in dotted lines in Fig. 1. In this position of the distributing pipe, the delivering nozzle may be brought above the surface of the liquid in the auxiliary tank, which, of course, will cause the flow through the delivery nozzle to cease. Inasmuch as the height of the liquid in the auxiliary tank above the nozzles varies the force with which the liquid is delivered from the delivering nozzles, the raising of the distributing pipe and nozzles to an intermediate position, would decrease the pressure of the liquid as it passes from the delivery nozzle. It will thus be seen that I have provided means wherein the delivering pressure of the liquid may be quickly varied when desired, or the flow may be caused to cease entirely. The operator is in a position so that he may readily view the contents within the auxiliary tank, and by means of the gate 18 and the hand lever 22, regulate the amount of liquid in the auxiliary tank.

While any amount of liquid may be allowed to flow into the auxiliary tank, within, of course, the limits of the tank, it is preferable to keep a small amount of liquid in the auxiliary tank, so that the pressure of the outflowing liquid will not be too great, and, furthermore, so that the distributing pipe may be readily lifted above the upper surface of the liquid, in order that the flow may be stopped.

As a means for spreading the liquid after being laid upon the road bed, or for dragging the surface of the road bed when desired, I have provided a plurality of brushes 69. Said brushes may be made of wire, heavy reeds or other suitable material, which are secured to a head 70, which in turn is detachably connected by means of bolts 71, to a supporting rod or shank 72. Said supporting shank 72 is pivoted at 73 to a supporting bar 74. Said bar 74 is provided with a cross rod 75, which rests on brackets 76, secured to the lower sides of the frame 7, and the intermediate frame parts 77. The supporting shank 72 is provided with a cross rod 78, which is adapted to engage seats 79 formed in the upper edges of the frame 7, and the intermediate frame parts 77. The supporting bar 74 extends beyond the pivot 73, so as to form a handle 80. The operator may readily grasp the handle 80, and swinging the supporting bar 74 about the cross rod 75 as a pivot, lift the cross rod 78 out of a seat 79, so that the same may be pushed forward or back and dropped into a corresponding seat 79. By this means, the position of the brushes 69 may be independently varied, so that said brushes may be arranged in a line at right angles to the line of movement of the distributer; or said brushes may be arranged in the form of a V, as shown in the plan view in Fig. 2; or said brushes may be arranged so as to crowd the material toward the center of the road bed, or toward the side of the road bed, in whichever way desired.

As a means for causing the brush to bear with some pressure upon the road bed, I have provided a supporting bracket 81, on which a bag of sand or other heavy object may be placed when desired. I have also provided a hand lever 82, which is pivoted at 83 to the supporting bar 74, and at its lower end connected by means of a chain 84, to a coiled spring 85, which is secured at 86 to the head 70 of the brush. The lever 82 is provided with a dog 87, which engages a rack 88 formed in the supporting bar 74. Said dog 87 is controlled by a hand latch 89, in the usual manner. By adjusting the lever 82, the tension on the spring 85 may be varied, and thus the pressure caused by the brush upon the road bed also varied. At the same time, the spring 85 will yield to allow the brush to pass over any permanent obstruction in the road bed. When it is not desired to use the brushes 69, or a portion thereof, they may be readily lifted, after releasing the lever 82, so as to engage the hook 90 with an eye 91, carried by the supporting shank of the brush, thus rendering the brush inoperative.

It will readily be understood that in operation, my distributing apparatus or machine, may be attached to any form of storage tank, and that when one tank is empty, said auxiliary distributing apparatus may be readily disconnected therefrom and connected to another. It will also be understood that the invention in its broader aspects is not limited to the details of construction herein shown; nor to the proportion of parts; nor to any particular form of construction, as changes may be made herein without departing from the main principle of the invention and without sacrificing its chief advantages.

Having thus described my invention, what I claim as new and desire to secure by Letters Patent, is:—

1. A brushing apparatus including in combination a supporting frame, adapted to be attached to a distributing device, wheels on which said frame is carried, a seat on said frame, a plurality of brushes, means for independently supporting said brushes on said supporting frame, and means adjacent said seat whereby the position of said brushes relative to each other may be independently adjusted longitudinally of the frame and the angle of the brushes relative to the supporting frame varied.

2. A brushing apparatus including in combination, a supporting frame, adapted to be attached to a distributing device, wheels on which said frame is carried, a plurality of brushes, means for independently supporting said brushes on said supporting frame, means whereby the position of said brushes relative to each other may be independently adjusted and the angle of the brushes relative to the supporting frame varied, a seat carried by said frame, and means whereby the pressure of the brushes upon the road bed may be independently adjusted, said means including a lever for each brush located adjacent said seat.

3. A brushing apparatus including in combination a supporting frame adapted to be connected to a distributing device, wheels on which said frame is carried, said frame having spaced intermediate parts, a plurality of brushes, means for supporting a brush in each of the spaces formed by the intermediate parts, means whereby each of the brushes may be independently adjusted longitudinally of the frame relative to the other, and means whereby the pressure of the brushes upon the road bed may be independently adjusted.

4. A brushing apparatus including in combination a supporting frame adapted to be connected to a distributing device, wheels on which said frame is carried, said frame having spaced intermediate parts, a plurality of brushes, means for supporting a brush in each of the spaces formed by the intermediate parts, means whereby each of the brushes may be independently adjusted relative to the other, said means including a bar slidingly connected at one end to said frame and near its other end having means for holding the bar in adjusted positions.

5. A brushing apparatus including in combination a supporting frame adapted to be connected to a distributing device, wheels on which said frame is carried, said frame having spaced intermediate parts, a plurality of brushes, means for supporting a brush in each of the spaces formed by the intermediate parts, means whereby each of the brushes may be independently adjusted relative to the other, said means including a bar slidingly connected at one end to said frame and near its other end having means for holding the bar in adjusted positions, a seat carried by said frame, and levers pivoted to said bar and located adjacent said frame for varying the pressure of the brushes upon the road bed.

6. The combination of a supporting frame, a bracket carried thereby and spaced therefrom, a supporting bar, a cross bar carried by said supporting bar and resting on said bracket, a brush, a shank for said brush pivoted to said supporting bar, said shank carrying a cross bar, seats in said supporting frame for said cross bar, whereby said supporting bar and brush may be adjusted relative to said frame.

7. The combination with a brush, of a supporting shank, to which said brush is detachably connected, a frame to which said brush is pivoted, a lever pivoted to said frame, a spring intermediate said lever and said brush, whereby the pressure of the brush on the road bed may be varied.

8. The combination with a brush, of a supporting shank to which said brush is detachably connected, a frame to which said brush is pivoted, a lever pivoted to said frame, a spring intermediate said lever and said brush, whereby the pressure on the road bed may be varied, and means whereby said brush may be rendered inoperative.

9. The combination with a brush, of a supporting shank to which said brush is detachably connected, a frame to which said brush is pivoted, a lever pivoted to said frame, a spring intermediate said lever and said brush, whereby the pressure of the brush on the road bed may be varied, and means whereby the tension of the spring may be varied.

10. The combination of a supporting frame, a bracket carried thereby, a seat carried by said bracket, a plurality of brushes, means whereby the position of said brushes relative to each other may be varied longitudinally of the frame, means for yieldingly pressing said brushes against the surface of the road bed, and a plurality of levers adjacent said seat for varying the pressure of said brushes on the road bed.

11. An oil distributing apparatus including in combination, means for distributing oil, a supporting frame, a plurality of brushes located in the rear of said supporting frame, means slidingly connected to said frame, to which said brushes are pivoted, whereby the position of said brushes relative to each other, may be adjusted, and a lever carried by each of said sliding means for varying the pressure of the brush supported thereby upon the road surfaces.

12. An oil distributing apparatus including in combination, means for distributing oil, a supporting frame, a plurality of bars having independent sliding connection with said frame, means for holding said bars in their adjusted positions, a brush pivoted to each of said bars, and means for varying the pressure of said brush upon the road bed surfaces.

In testimony whereof I affix my signature, in presence of two witnesses.

CHARLES P. PRICE.

Witnesses:
FANNIE W. NOBLE,
ARTHUR F. JOHNSON.